F. P. MIES.
VENTILATING DEVICE.
APPLICATION FILED NOV. 10, 1910.
1,038,625.
Patented Sept. 17, 1912.
6 SHEETS—SHEET 3.
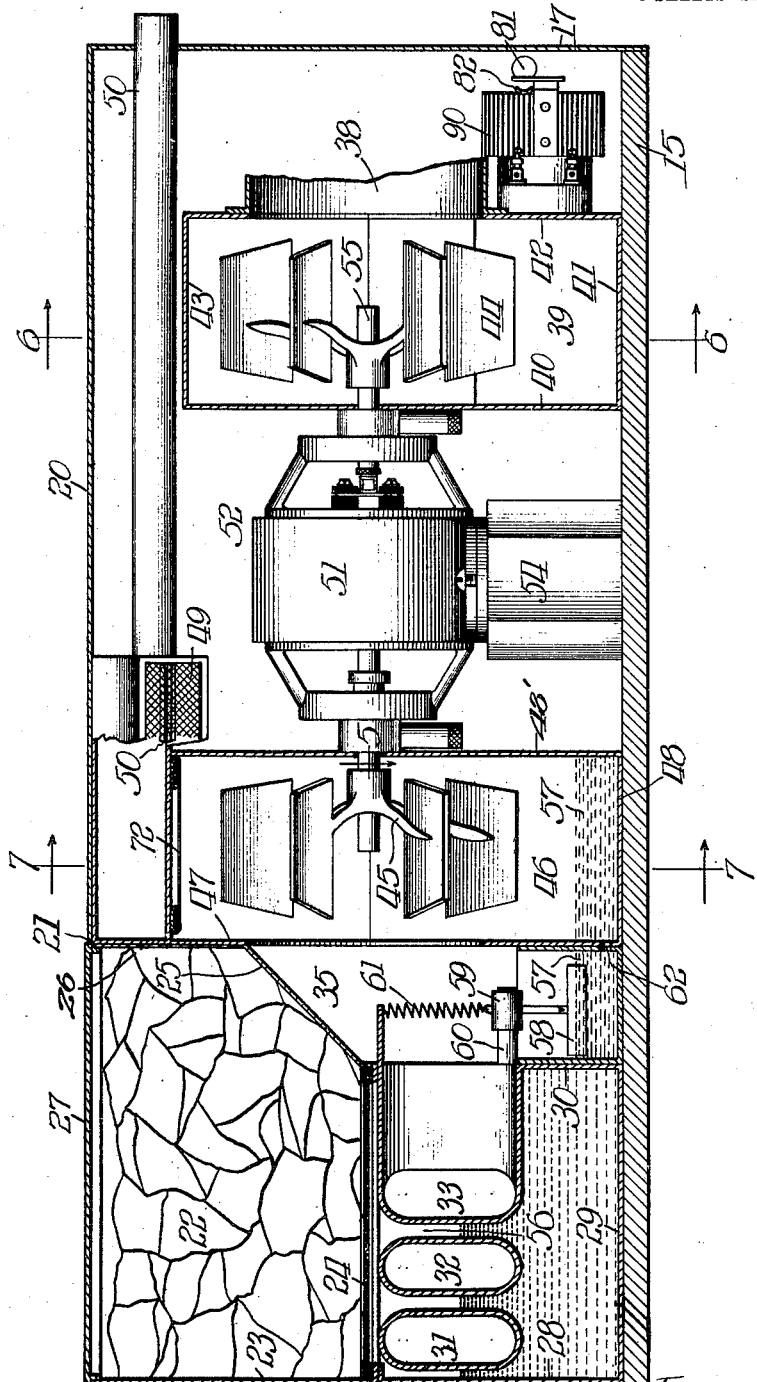

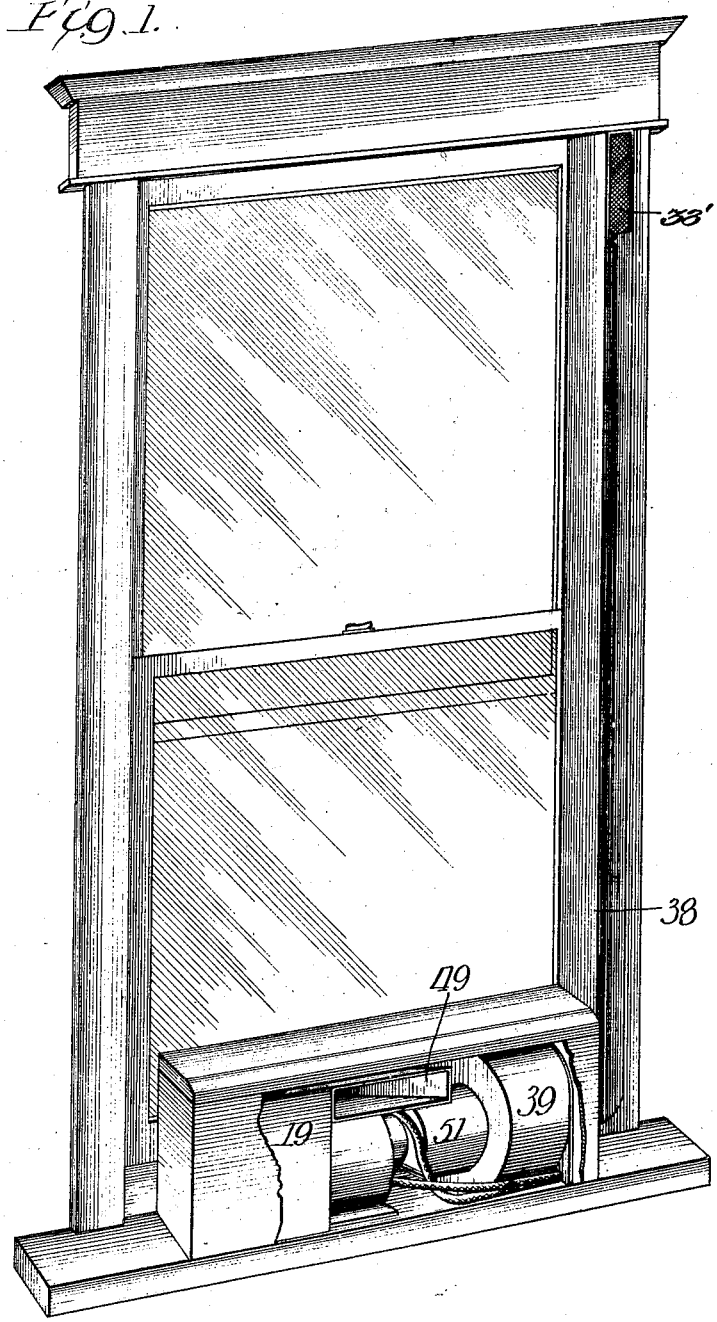

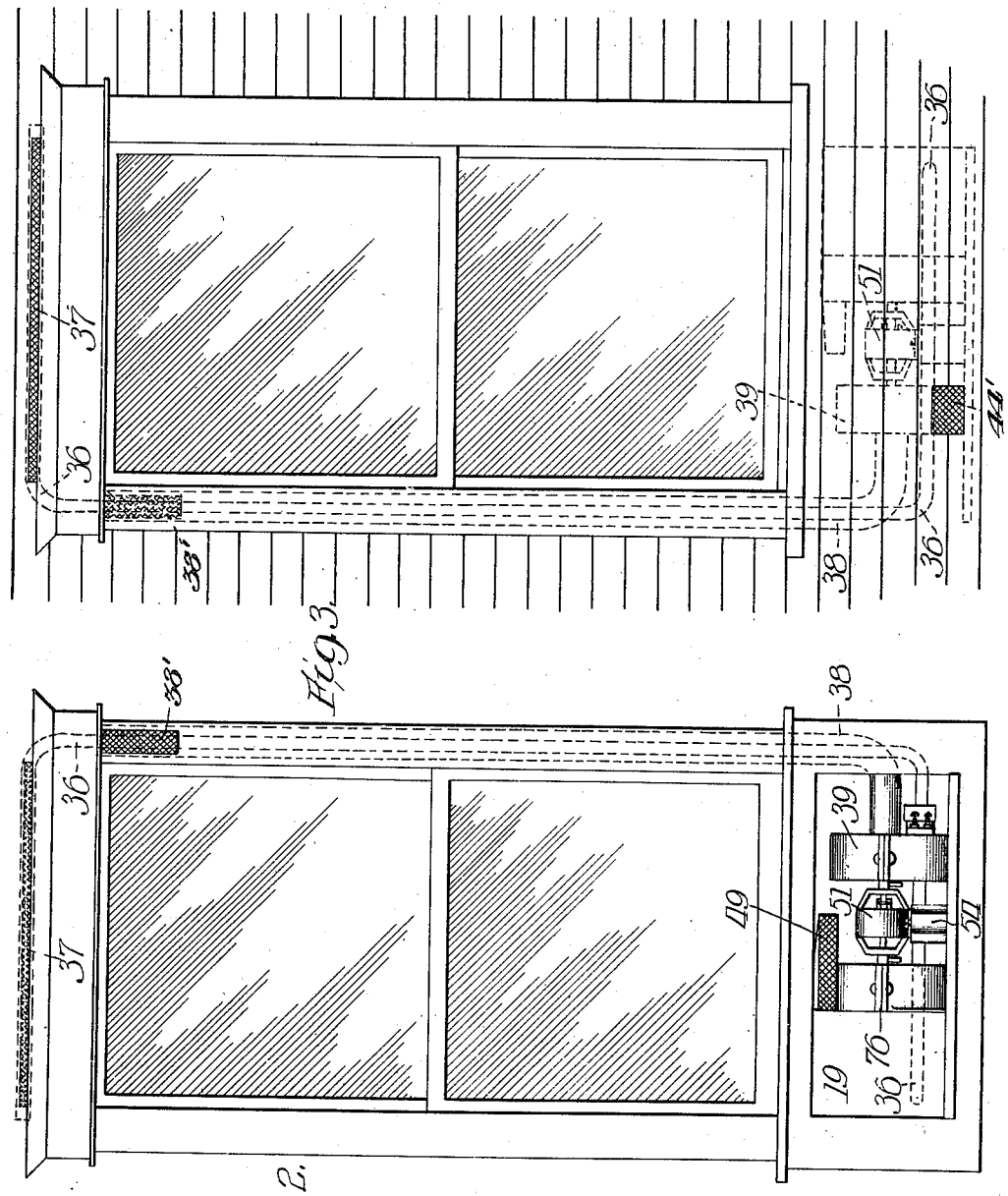

F. P. MIES.
VENTILATING DEVICE.
APPLICATION FILED NOV. 10, 1910.

1,038,625.

Patented Sept. 17, 1912.

6 SHEETS—SHEET 4.

Witnesses
H. R. White
R. A. White

Inventor
Frank P. Mies
By Foree Bain May
Attys

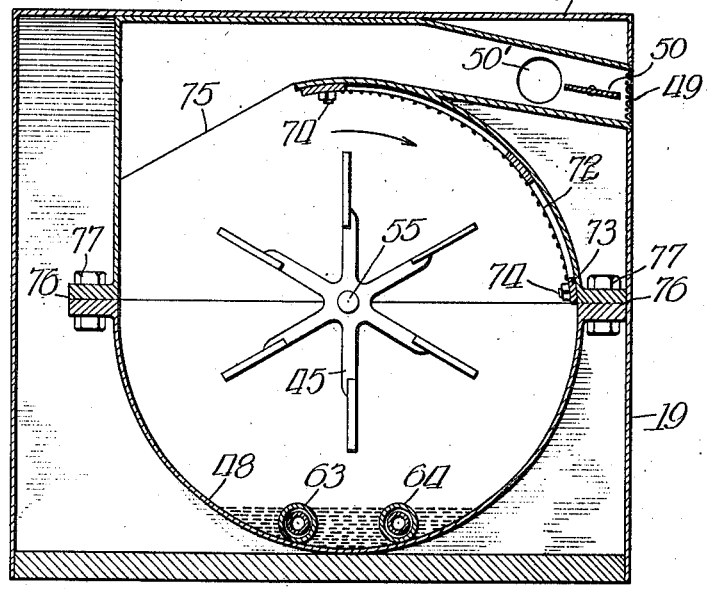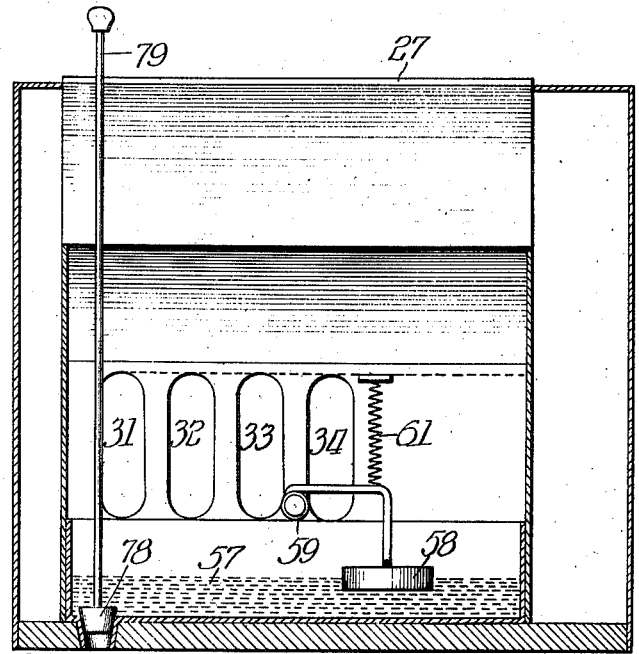

F. P. MIES.
VENTILATING DEVICE.
APPLICATION FILED NOV. 10, 1910.
1,038,625.
Patented Sept. 17, 1912.
6 SHEETS—SHEET 6.
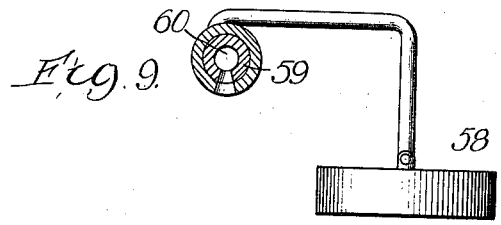
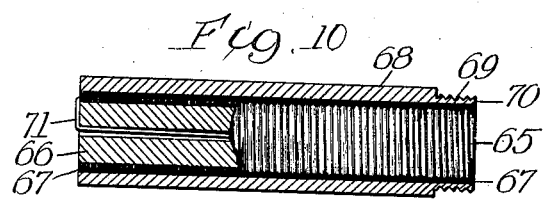
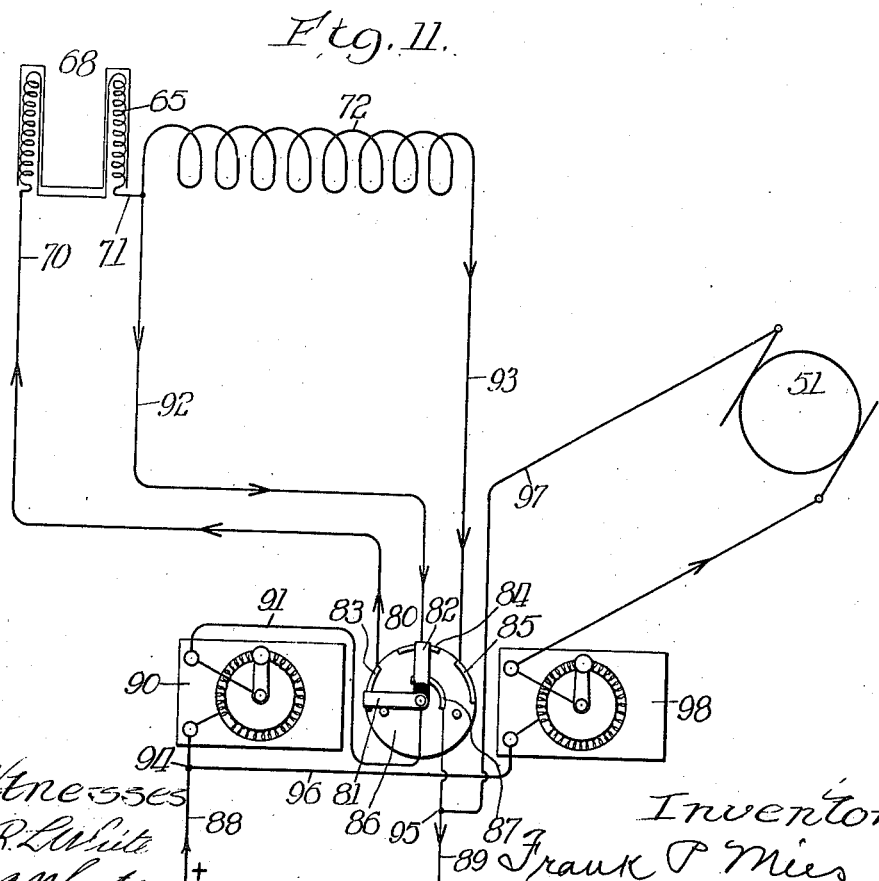
Inventor
Frank P Mies
By Forée Bain May Attys
Witnesses
H. R. White
R. White

UNITED STATES PATENT OFFICE.

FRANK P. MIES, OF CHICAGO, ILLINOIS.

VENTILATING DEVICE.

1,038,625.   Specification of Letters Patent.   Patented Sept. 17, 1912.

Application filed November 10, 1910. Serial No. 591,665.

*To all whom it may concern:*

Be it known that I, FRANK P. MIES, a citizen of the United States, residing at Chicago, in the county of Cook and State of Illinois, have invented certain new and useful Improvements in Ventilating Devices, of which the following is a specification.

My invention relates to improvements in ventilating devices, and has for one of its objects to provide a self-contained, neat, and efficient machine adapted and arranged for portable use and especially designed for association with a window of a room or apartment.

Other and further objects of my invention will become readily apparent to persons skilled in the art from a consideration of the specification taken in conjunction with the drawings, wherein—

Figure 5:
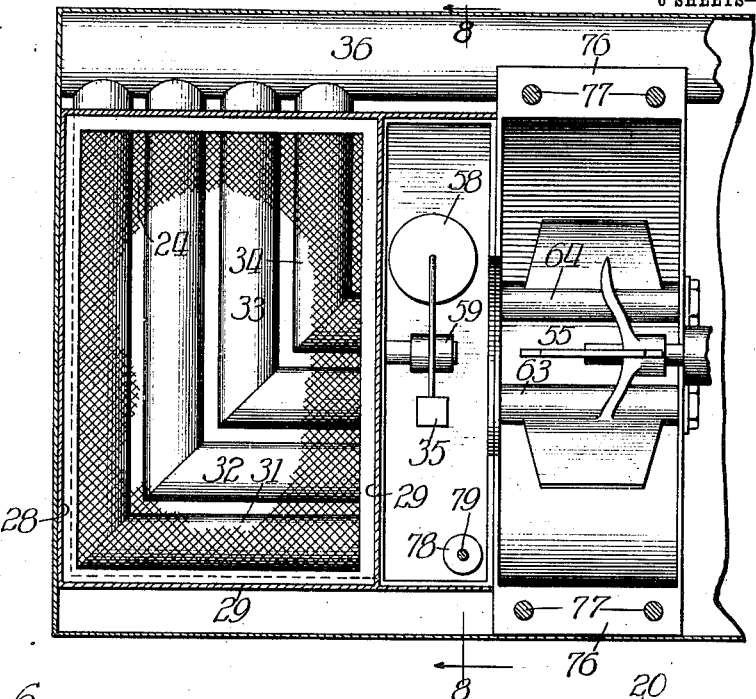
Figure 6:
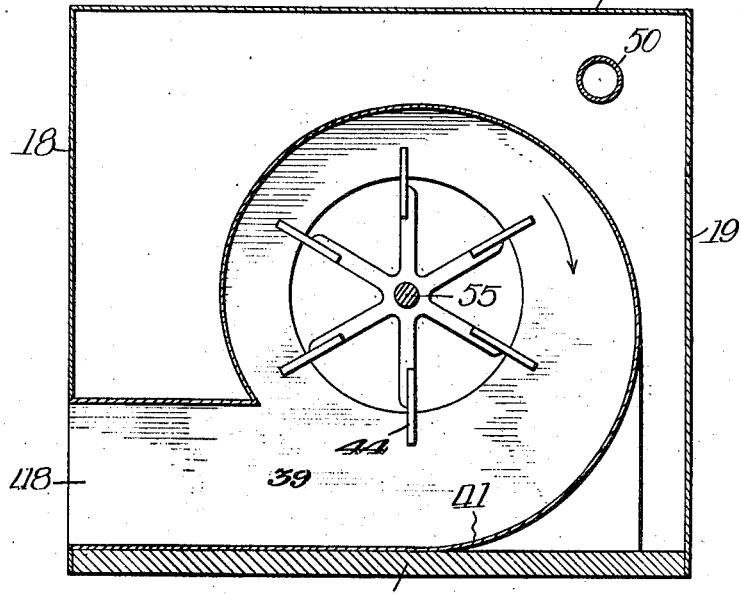

Figure 1 is a broken away elevation of the device, showing its position on a window ledge within an apartment; Fig. 2 is a similar view, showing the interior of an apartment with the device below the window; Fig. 3 is a similar view, showing the exterior of the apartment and the outlines of the device and air conducting pipes in dotted lines; Fig. 4 is a longitudinal central section showing the parts in elevation; Fig. 5 is a fragmentary sectional view taken on line 5—5 of Fig. 4; Fig. 6 is a sectional view taken on line 6—6 of Fig. 4; Fig. 7 is a cross sectional view taken on line 7—7 of Fig. 4; Fig. 8 is a cross sectional view, taken on line 8—8 of Fig. 5; Fig. 9 is a detail of a float device; Fig. 10 is a longitudinal sectional view of an electric heating device; and Fig. 11 is a diagrammatic view of the electric circuits of the machine.

In all of the views the same reference characters refer to similar parts.

The entire apparatus is contained within a casing consisting of a base plate, 15, end walls 16 and 17, side walls 18 and 19, and a top wall 20, the latter extending uninterruptedly to a point 21 (Fig. 4) where it is cut away to admit of the introduction, from above, of the ice chamber casing, 22, composed of the walls 23, 24, 25, and 26, and a removable cover, 27. Another chamber, bounded by walls, 28, 29, and 30, contains air circulating pipes 31, 32, 33, and 34, which are open to the fan intake, humidifying chamber, 35, and at the other end communicate with an air intake conduit, 36 that leads to a grating 37 (Fig. 2) placed in the outside of the wall of the apartment above the window. This pipe 36 passes through the interior of a similar pipe or duct, 38, which leads to the fan casing, 39, composed of the walls 40, 41, 42, and 43, of the foul air fan 44. The discharge into the open air from fan 39 is effected through grating 44'. In cold weather, the foul air may be taken from near the top of the apartment by fan 39 through pipe 38, said pipe communicating with the apartment through the grating 38'. The heated foul air gives up some of its heat to the incoming fresh air which is taken through the smaller interior pipe 36, and is exhausted into the room or apartment by fresh air fan 45. The fresh air is heated in chamber 46 of said fan 45, inclosed by the walls, 47, 48, and 48', and is delivered through the grated opening 49. When desired, the damper 50 may be closed to shut off the fresh air inlet 49, and the fresh warmed or cooled air may be delivered through the pipe 50', and conveyed to a distant point, where it may be utilized by an invalid or used for other desirable purposes.

A motor 51, preferably electrically driven, is located in a chamber 52, upon the foundation block 54 and upon the ends of the projecting shaft 55, are secured the fans 44 and 45 respectively.

To cool the incoming air an ice chamber 22 is provided to contain ice as shown, the wall 24 whereof is perforated to permit the drippings from the ice to flow over the exterior surfaces of the air intake pipes 31, 32, 33, and 34, and thereby cool the incoming air. The water is caught in the lower chamber 56, and is subsequently used to humidify the air, and to catch particles of material held in mechanical suspension, as in chambers 35 and 46. The incoming air may be humidified and purified by the water 57 contained in the bottom of the casings, 35 and 46, the uniform level being maintained by a float 58, controlling a valve 59, connected with a pipe 60, communicating with chamber 56. A spring 61 may or may not be employed to assist the buoyancy of the float in the operation of the closing of the valve. An orifice 62 permits the water to flow from chamber 35 to the fan chamber 46. If the water, 57, be heated, and thereby vaporized, it will be more readily taken up by the air passing through the chambers, 36 and 46, and hence the humidifying effect produced upon the incoming air will be greatly increased. To this end, I provide an electric heater, and submerge it in the water. In the exemplification, I have shown two such heaters, 63, and 64, of which any convenient number may be used. Specifically, the heater consists of a wire, 65, wound around a hollow tube, 66, insulated as at 67, and forced into a metallic attaching tube, 68, provided with a screw-threaded end 69, by means of which the device may be conveniently attached to a suitable fixture within the humidifying or fan casing. Two terminals, 70 and 71, are provided, the former, for convenience, being electrically connected to the metallic tube, 68. Another electrical heating device, 72, is employed for heating the incoming air. It is so arranged that it heats the air immediately before it becomes humidified. In the exemplifications, it is shown (Fig. 7) to be an arch-shaped frame, 73, of insulating and relatively refractory material, secured to the curved wall of the casing of fan 45, by means of bolts and nuts 74. The fan blades press the incoming air into contact with the heater before it is swept downwardly into contact with water contained in the casing, and the vapor rising therefrom is absorbed by the heated air which finally presses out of the opening, 75, and the opening 49 into the room. The casing of fan, 45, may be divided at 76 by removal of bolts, 77, in which event the heater may be bodily removed with the upper half.

To empty the water from the chambers 46 and 35, I provide a valve plug, 78, operated from above by means of a stem, 79, so that when the water accumulates faster than the air takes it up, the surplus may be conveniently disposed of in this manner.

In the diagram, Fig. 11, a switch 80 is provided with two independently rotatable contact blades or arms, 81 and 82. Three coacting segments, 83, 84, 85, are arranged near the outside periphery of the switch block, 86. Another segment, 87, is adapted for connection with arm 82 only. The electric mains are indicated by 88 and 89. In the positions shown, the circuit is complete, as indicated by the arrows, from 88 to the rheostat 90, by wire 91 to arm 81, segment 83, by wire 70 to the water-heater 68, thence by wire 92 to segment 84 and switch arm 82 to main 89; thus the current passes through the water heater only and the strength of the current may be adjusted by the rheostat 90. If the switch arm 82 be moved to contact 85, the current will pass through both heaters, the water heater and the air heater, in series. If the arm 81 be now moved to segment 84, the current will pass through the air heater only, all of which is clearly apparent. Branching at points 94 and 95 is the motor circuit including wires 96, and 97, the motor 51, and the rheostat, or starting box 98. By this arrangement, the heating devices may be operated independently and under perfect control.

When desired the ice within the containing receptacle 22 may be removed and the air may be heated by the air heating device, 72, instead of being cooled by the ice within the chamber 22.

My invention is especially well adapted for hospital use in cases where it is desirable constantly to maintain a chamber at a given temperature and with air in which the humidity is readily controllable and where frequent change of air is necessary.

Having thus described my invention, what I claim is:

1. In a ventilating device, the combination of a fan, a fan casing containing in its bottom under the fan a liquid reservoir, a source of liquid supply, means for automatically maintaining the liquid at a predetermined height therein relatively close to the tips of the fan, and an electric heater adapted and arranged to be submerged in said liquid.

2. In a ventilating device the combination of a fan, a fan casing providing an approximately circular path for air adjacent the tips of the fan, said casing containing in its bottom a liquid reservoir, an electric heater adapted and arranged to vaporize said liquid, an air heating means mounted upon the casing in position to heat the air in said circular path before it reaches the liquid reservoir in the bottom of the casing, and means for controlling said vaporizing means.

3. In a ventilating device, the combination of a centrifugal fan, a scroll-shaped fan casing having a tangential outlet above its bottom to provide directly under the fan a liquid reservoir, and, within the clearance between said fan and casing, means for vaporizing said liquid and an independent air heating means.

4. In a ventilating device, the combination of a fan, a fan casing containing a liquid reservoir, an electrical liquid-heating device to vaporize said liquid submerged therein, an air heating device within said fan casing, and means for regulating the current supplied to said heating devices.

5. In a ventilating device, the combination of a fan, and a casing therefor, with a humidifying casing to contain water, opening into the air inlet of said fan casing, an ice casing, a water receptacle therebeneath to receive drippings therefrom, a water connection between the water receptacle and the humidifying chamber, a valve for the connection, and a float device in the humidifying chamber to operate said valve for automatically maintaining the water level therein.

6. In a ventilating device, the combination of an electric motor, a fan, and a casing therefor, the latter provided with a chamber for water to catch dust particles contained in the air, an electric heater to vaporize the water for humidifying the air, means for varying the temperature of said heater, and independent means for varying the speed of the motor.

7. In a ventilating device, the combination, with a receptacle for liquid, of a centrifugal fan, a casing therefor having a tangential outlet above its bottom to provide in said bottom a liquid containing space, and means without said casing to control the height of liquid therein comprising a casing providing a second liquid-containing space, communicating with the liquid containing space in the fan casing for maintenance of equal liquid level in both spaces, and float valve in the second space controlling flow of fluid into said second space from the liquid receptacle.

8. In a ventilating device, the combination, with a receptacle for liquid, of a centrifugal fan, a casing therefor having a tangential outlet above its bottom to provide in said bottom a liquid containing space, and means without said casing to control the height of liquid therein comprising a casing providing a second liquid-containing space, communicating with the liquid-containing space in the fan casing for maintenance of equal liquid level in both spaces, the casing forming said second liquid-containing space constituting the inlet chamber to said fan casing, and a float valve in the second liquid-containing space controlling flow of fluid into said second space from the liquid receptacle.

9. In a ventilating device, the combination with a receptacle for liquid, of a centrifugal fan, a casing therefor having a tangential outlet above its bottom to provide in said bottom a liquid-containing space; means without said casing to control the height of liquid therein comprising a casing providing a second liquid-containing space, communicating with the liquid-containing space in the fan casing for maintenance of equal liquid level in both spaces, the casing forming said second liquid-containing space constituting the inlet chamber to said fan casing, and a float valve in the second liquid containing space controlling flow of liquid into said second space from the liquid receptacle; and pipes leading through said liquid receptacle to said inlet chamber.

10. In a ventilating device, the combination, with a receptacle for liquid, of a centrifugal fan, a casing therefor having a tangential outlet above its bottom to provide in said bottom a liquid-containing space; means without said casing to control the height of liquid therein comprising a casing providing a second liquid-containing space, communicating with the liquid-containing space in the fan casing for maintenance of equal liquid level in both spaces, the casing forming said second liquid-containing space constituting the inlet chamber to said fan casing, and a float valve in the second liquid-containing space controlling flow of liquid thereinto from the liquid receptacle; pipes leading through the upper portion of said liquid receptacle to said inlet chamber, and an ice chamber above said receptacle having a reticulated bottom for dripping of the melted ice over said pipes into said liquid receptacle.

11. A device for ventilating an apartment having a window frame, comprising a motor at the lower end of the frame, a drive shaft having its ends extending from opposite sides of the motor, a fan upon each end of the shaft, a casing for each fan, and piping connections leading respectively from the outer atmosphere at a point above the window frame downwardly to one of the fan casings and from said casing to the interior of the apartment, and leading from the interior of the apartment at a relatively high point on the frame downwardly around the downwardly leading pipe of the first fan to the other fan, and from the latter to the exterior.

In testimony whereof I hereunto set my hand in the presence of two witnesses.

FRANK P. MIES.

In the presence of—
W. LINN ALLEN,
MARY F. ALLEN.